United States Patent [19]

Drennen et al.

[11] Patent Number: 5,119,921

[45] Date of Patent: Jun. 9, 1992

[54] BAFFLE WALL FOR A COVER OF A VISCOUS FLUID CLUTCH AND METHOD

[75] Inventors: David B. Drennen, Bellbrook; Ronald G. Huth, Huber Heights; David M. Hudson, Kettering, all of Ohio

[73] Assignee: General Motors Corporation, Detroit, Mich.

[21] Appl. No.: 749,809

[22] Filed: Aug. 26, 1991

Related U.S. Application Data

[63] Continuation-in-part of Ser. No. 651,875, Feb. 7, 1991.

[51] Int. Cl.⁵ ............................................. F16D 35/00
[52] U.S. Cl. ................................. 192/58 B; 192/82 T
[58] Field of Search ............................ 192/58 B, 82 T

[56] References Cited

U.S. PATENT DOCUMENTS

| | | | |
|---|---|---|---|
| 3,559,786 | 2/1971 | Long | 192/58 B |
| 3,648,811 | 3/1972 | La Flame | 192/58 B |
| 4,346,797 | 8/1982 | Bopp | 192/82 T |
| 4,544,053 | 10/1985 | Yamaguchi et al. | 192/58 B |
| 4,974,712 | 12/1990 | Brown | 192/58 B |

Primary Examiner—Leslie A. Braun
Assistant Examiner—Nicholas Whitelaw
Attorney, Agent, or Firm—A. Michael Tucker

[57] ABSTRACT

A viscous fluid clutch includes an internally-mounted pump plate for separating a working chamber from a reservoir. Discharge ports in the pump plate permit fluid flow from the reservoir to the working chamber. Return orifices in the pump plate direct return flow back to the reservoir. A rotatable control arm is supported by arcuate baffle walls formed in a cover to enhance the seal provided at the discharge ports. The baffle walls limit the amount of fluid which can collect at a discharge port from the reservoir when the clutch is at rest.

13 Claims, 3 Drawing Sheets

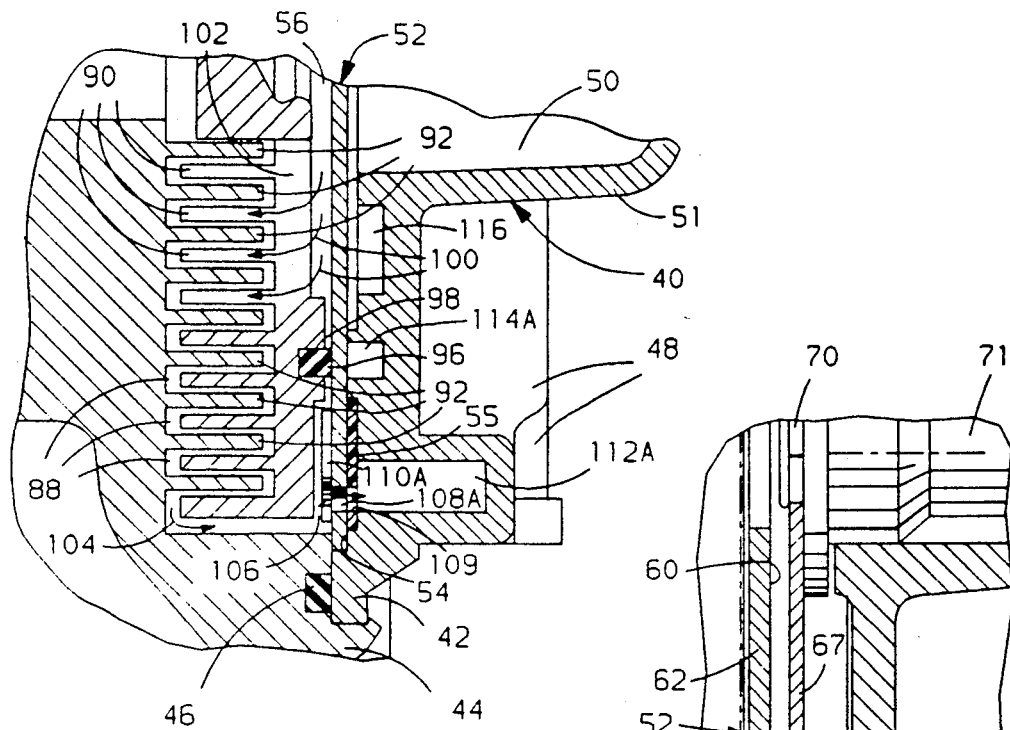
FIG. 2
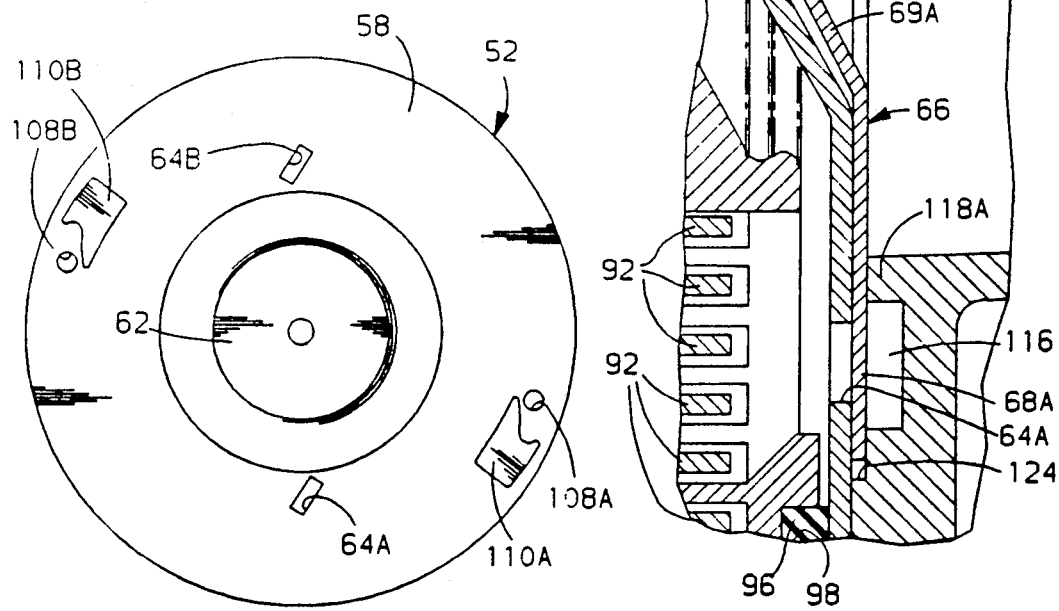
FIG. 3
FIG. 5

BAFFLE WALL FOR A COVER OF A VISCOUS FLUID CLUTCH AND METHOD

CROSS REFERENCE TO RELATED APPLICATION

This is a continuation-in-part of application Ser. No. 07/651,875, filed Feb. 7, 1991.

BACKGROUND OF THE INVENTION

1. Field of the Invention

The present invention relates generally to a viscous fluid drive device. In particular, the present invention is concerned with a baffle wall formed in a cover of a viscous fluid clutch to support a rotatable control arm.

2. Statement of the Related Art

A thermostatically-controlled viscous fluid clutch for driving and rotating a vehicle cooling fan is well-known. A multi-bladed fan is removably secured to a body of the clutch. The fan and clutch assembly is installed between an accessory pulley of a vehicle engine (typically the water pump pulley) and a radiator. The clutch drives the fan at high speeds close to input speed when cooling is required and permits the fan to rotate at low speeds when cooling is not required. Thermostatic control of the fan through the clutch reduces the airflow noise caused by fan rotation and the load on an engine, resulting in horsepower gain and improved fuel economy.

A clutch plate, housed within the clutch, having lands and grooves is mated to the body having complementary lands and grooves. A pump plate divides the interior volume of the clutch into a pair of fluid chambers, a working chamber and a reservoir. Discharge ports in the pump plate permit selective flow of a viscous fluid from the reservoir to the working chamber into a shear zone formed between the lands and grooves of the body and clutch plate. Fluid shear in the lands and grooves transfers input torque from the clutch plate to drive the body and the attached fan.

When cooling is not required, the discharge ports in the pump plate are closed and the fluid in the shear zone is pumped into a pumping chamber. Return orifices in the pump plate permit passage of the fluid from the pumping chamber into the reservoir. The removal of a majority of the fluid from the shear zone substantially reduces the shear between the clutch plate and the body, thereby substantially reducing the rotation of the fan.

A control arm is placed adjacent the pump plate and is rotated to cover and uncover the discharge ports, thereby controlling fluid flow from the reservoir. Oftentimes, a bimetallic element is utilized to actuate the control arm. The bimetallic element may be connected to a control shaft which is in turn connected to the control arm. As the bimetallic element expands due to warm ambient air, the shaft rotates, thereby causing rotation of the control arm. As the ambient air cools, the bimetallic element contracts, causing the control shaft and the control arm to rotate in an opposite direction.

To accommodate manufacturing and assembly tolerances, and the expansion and contraction of a bimetallic element, the control shaft and the control arm are permitted to slide or "float" for small distances in conventional fan clutch assemblies. Such float or "end play" occurs along the longitudinal axis of the shaft. The end play of the control shaft permits greater machining and assembly tolerances, thereby reducing manufacturing costs. Furthermore, friction between the bimetallic element and a cover is reduced by the end play of the control shaft.

As the control shaft slides in a direction away from the pump plate, the attached control arm is pulled away from the pump plate and tends to wobble during rotation. When the control arm is in the closed position and pulled from the pump plate, leakage of fluid from the reservoir to the working chamber can occur at the discharge ports. Unwanted fluid can flow into the shear zone and create undesired high-speed rotation of the cooling fan when an engine is next started. Such high-speed operation creates unwanted airflow noise and can increase an engine warm-up period.

A condition known as "after-boil" can occur when an engine is shut off immediately after a stabilized, heavily-loaded drive (e.g., a long drive up a sustained grade pulling a trailer). Underhood temperatures in the engine compartment can result in a radiator core temperature which reaches the coolant boiling point. Such temperatures can cause the bimetallic element to react and rotate the control arm, thereby permitting fluid to leak from the reservoir to the shear zone. When the engine is next started, undesired high-speed fan rotation can occur.

When an engine is not running, fluid pressure may cause the migration of fluid from the reservoir into the pumping chamber through the pump plate return orifices and into the shear zone. When an engine is next started, undesired high-speed operation of the fan can occur.

The art continues to seek improvements. It is desirable that a viscous fluid clutch provide thermostatic operation of a fan when cooling is required. Furthermore, it is desirable that a clutch prevent the migration of fluid from a reservoir to the shear zone through pump plate discharge ports and return orifices when the engine is not in operation, thereby eliminating high-speed operation and unwanted airflow noise when an engine is started.

SUMMARY OF THE INVENTION

The present invention includes a viscous fluid drive device particularly suitable for a fan clutch of a vehicle. The present fan clutch utilizes fluid return channels formed in the cover to prevent the migration of fluid through pump plate return orifices from a reservoir into a pumping chamber when the clutch is in a static condition. A baffle wall formed in the cover supports a control arm to enhance the seal provided at discharge ports in the pump plate.

In a preferred embodiment, a viscous fluid clutch includes an internally-mounted pump plate for separating a working chamber from a reservoir. Discharge ports in the pump plate permit fluid flow from the reservoir to the working chamber. Return orifices in the pump plate direct return flow back to the reservoir. A rotatable control arm is supported by arcuate baffle walls formed in a cover to enhance the seal provided at the discharge ports. The baffle walls limit the amount of fluid which can collect at a discharge port from the reservoir when the clutch is at rest.

BRIEF DESCRIPTION OF THE DRAWINGS

FIG. 2 is an enlarged view of a portion of the clutch of FIG. 1 wherein the pump plate, the control arm, the cover and the housing have been rotated approximately 45 degrees to illustrate fluid flow from a pumping chamber through return orifices to a fluid accumulator formed in the cover.

FIG. 3 is a reduced rear elevational view of the pump plate, removed from the clutch position of FIG. 1 for purposes of clarity, illustrating a pair of discharge ports, and a pair of return orifices and their respective wipers.

FIG. 5 is an enlarged view of a portion of the control arm, the pump plate and the cover of FIG. 1 illustrating the support of the control arm by a baffle wall.

DETAILED DESCRIPTION OF THE PREFERRED EMBODIMENTS

Figure 1:
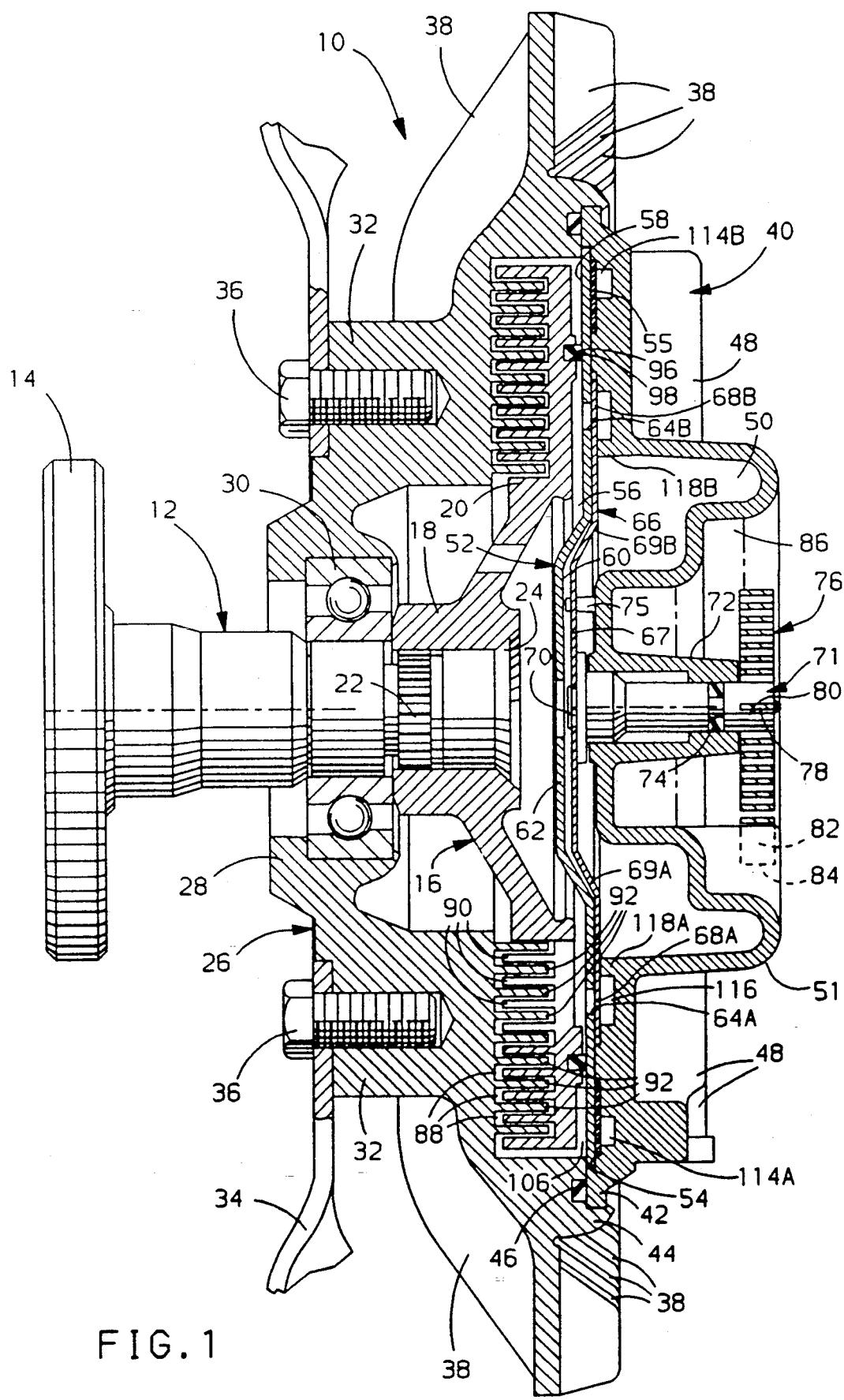
FIG. 1 is an axial Sectional view of an assembled viscous fluid clutch and attached fan incorporating a cover having fluid return channels and baffle walls according to the present invention.

A viscous fluid clutch indicated generally at 10 is illustrated in FIG. 1. The clutch 10 includes a rotatably driven input shaft indicated generally at 12. The input shaft 12, which can be provided with multiple steps as illustrated in FIG. 1, preferably terminates at its first or innermost end in a flange 14. The flange 14 is typically secured to a conventional engine water pump (not illustrated) to drive the clutch 10 as described below.

A clutch plate indicated generally at 16 includes a central hub portion 18 and an annular disk portion 20. The central hub portion 18 receives a knurled or serrated portion 22 of the input shaft 12 to provide an interference fit between the clutch plate 16 on the shaft 12. In this manner, the rotation of the input shaft 12 causes rotation of the clutch plate 16. A second end of the input shaft 12 can be machined as indicated at 24 to retain the clutch plate 16 on the input shaft 12. It is appreciated that other constructions, e.g., splining, can be utilized to drivingly connect the clutch plate 16 to the input shaft 12.

A housing indicated generally at 26 is a dished member having a hub portion 28 rotatably mounted on the input shaft 12 by an inner race of a bearing set 30. A plurality of bosses 32 is formed on the exterior surface of the housing 26. A multi-bladed fan 34, partially illustrated in FIG. 1, is attached by threaded fasteners 36 to the bosses 32. A plurality of fins 38 is provided on the outer surface of the housing 26 to dissipate heat transferred from a viscous fluid (not illustrated) contained inside the clutch 10.

A cover indicated generally at 40 is a dished member having an annular outer edge 42 secured to the housing 26 by an annular retainer lip 44 spun over from the material at the outer periphery of the housing 26. An annular seal 46 is interposed between the edge 42 and a front face of the housing 26 to prevent leakage from the interior of the clutch 10. A plurality of fins 48 is provided on the outer surface of the cover 40 to dissipate heat transferred from the fluid. A fluid reservoir 50 is formed as an annular channel or chamber in the interior surface of the cover 40 and bounded by a raised, annular reservoir-defining portion 51.

A disk-like pump plate indicated generally at 52 is installed in the interior of the clutch 10. The pump plate 52 is positioned on a shoulder 54 of the cover 40 and then drivingly secured between the housing 26 and the cover 40 when the clutch 10 is assembled. If desired, an annular gasket 55 can be positioned between the pump plate 52 and the cover 40 to enhance the seal against fluid leakage. The pump plate 52 separates a working chamber 56 from the fluid reservoir 50. In the view of FIG. 1, the working chamber 56 is the interior volume of the clutch 10 to the left of the pump plate 52. For purposes of this specification, a first or rear surface 58 of the pump plate 52 is in communication with the working chamber 56 and a second or front surface 60 of the pump plate 52 is mounted on the shoulder 54 and in communication with the reservoir 50. The pump plate 52 includes a central depression 62 which is fitted into the hub portion 18 of the clutch plate 16.

As illustrated in FIGS. 1 and 3, a pair of diametrically opposed discharge ports 64A, 64B are provided in a portion of the pump plate 52 radially outbound of the depression 62. Hydraulic pressure causes the flow of fluid through the discharge ports 64A, 64B from the reservoir 50 into the working chamber 56 as described below. A rotatable control arm indicated generally at 66 controls fluid flow into the working chamber 56. Preferably, the control arm 66 is a formed strip of spring steel. In the embodiment illustrated, the control arm 66 is a flexible, longitudinal member having a planar central portion 67 and opposite planar wings 68A, 68B connected to the central portion 67 by respective ramp portions 69A, 69B to form a profile complementary to the pump plate 52. When assembled in the clutch 10, the wings 68A, 68B are in contact with the front surface 60 of the pump plate 52 to cover and uncover respective discharge ports 64A, 64B.

The control arm 66 is drivingly connected to a squared end 70 of a shaft 71 rotatably mounted in a tubular hub 72 formed in the cover 40. An O-ring seal 74 is mounted in an annular groove in the shaft 71 and makes peripheral contact with the inner wall of the hub 72 to prevent fluid leakage to the exterior of the clutch 10. Rotational movement of the control arm 66 can be limited by stops 75 formed in the inner surface of the cover 40.

A bimetallic coil indicated generally at 76 is mounted at a first end 78 in a slot 80 on the forward end of the shaft 71. A second end 82 of the bimetallic coil 76 is mounted in a slot 84 formed in the exterior of the cover 40. Preferably, the bimetallic coil 76 is recessed within a cavity 86 surrounding the hub 72 and bounded by the annular raised portion 51 of the cover 40. The bimetallic coil 76 responds to the ambient air temperature surrounding the cover 40. An increase in air temperature causes the coil 76 to expand, thereby rotating the shaft 71 and the control arm 66 to uncover the discharge ports 64A, 64B in the pump plate 52. When the air temperature has decreased to a predetermined level, the bimetallic coil 76 contracts, causing the shaft 71 and control arm 66 to rotate back to their original positions, thereby covering the discharge ports 64A, 64B in the pump plate 52 and blocking fluid flow.

A fluid shear zone 88 is formed in the space between interleaved concentric annular lands or ridges 90 formed on a rear or inner surface of the disk portion 20 of the clutch plate 16 and corresponding concentric annular lands or ridges 92 formed on an interior surface of the housing 26. Fluid sheared in the shear zone 88 transmits input torque from the rotatably driven clutch plate 16 to provide hydraulic drive of the housing 26 and the attached fan 34.

Fluid flow through the shear zone 88 is illustrated best in FIG. 2. When the control arm 66 (not visible in the position illustrated in FIG. 2) is rotated to uncover the discharge ports 64A, 64B, fluid flows from the reservoir 50 into the working chamber 56. Centrifugal forces of the rotating clutch 10 direct the fluid into a radial flow between the pump plate 52 and the clutch plate 16. A blocking ring 96, preferably formed from polytetrafluoroethylene or a similar material, is provided in an annular groove 98 in a front surface of the clutch plate 16. Radial flow encounters the blocking ring 96 and is redirected to axial flow indicated at directional arrows 100 to flow through a plurality of passages 102 provided in the ridges 90 of the disk portion 20 of the clutch plate 16. Centrifugal forces cause the fluid to be dispersed radially outwardly throughout the shear zone 88. Fluid friction in the shear zone 88 transmits the rotation of the clutch plate 16 to the housing 26. As the housing 26 rotates, the attach(R)d fan 34 is rotated to draw cooling air through a radiator (not illustrated) and cool an internal combustion engine in a well-known manner.

Fluid exits the shear zone 88 as indicated at directional arrow 104 into an annular pumping chamber 106 formed and bounded by the clutch plate 16, the pump plate 52 and the blocking ring 96. Fluid is pumped from the pumping chamber 106 back to the reservoir 50 through a pair of diametrically opposed return orifices 108A, 108B provided in the pump plate 52 and aligned openings 109 in the gasket 55. As illustrated best in FIG. 3, a respective wiper 110A, 110B is provided at each orifice 108A, 108B to enhance fluid flow from the pumping chamber 106 through the orifices 108A, 108B in a well-known manner.

Figure 4:
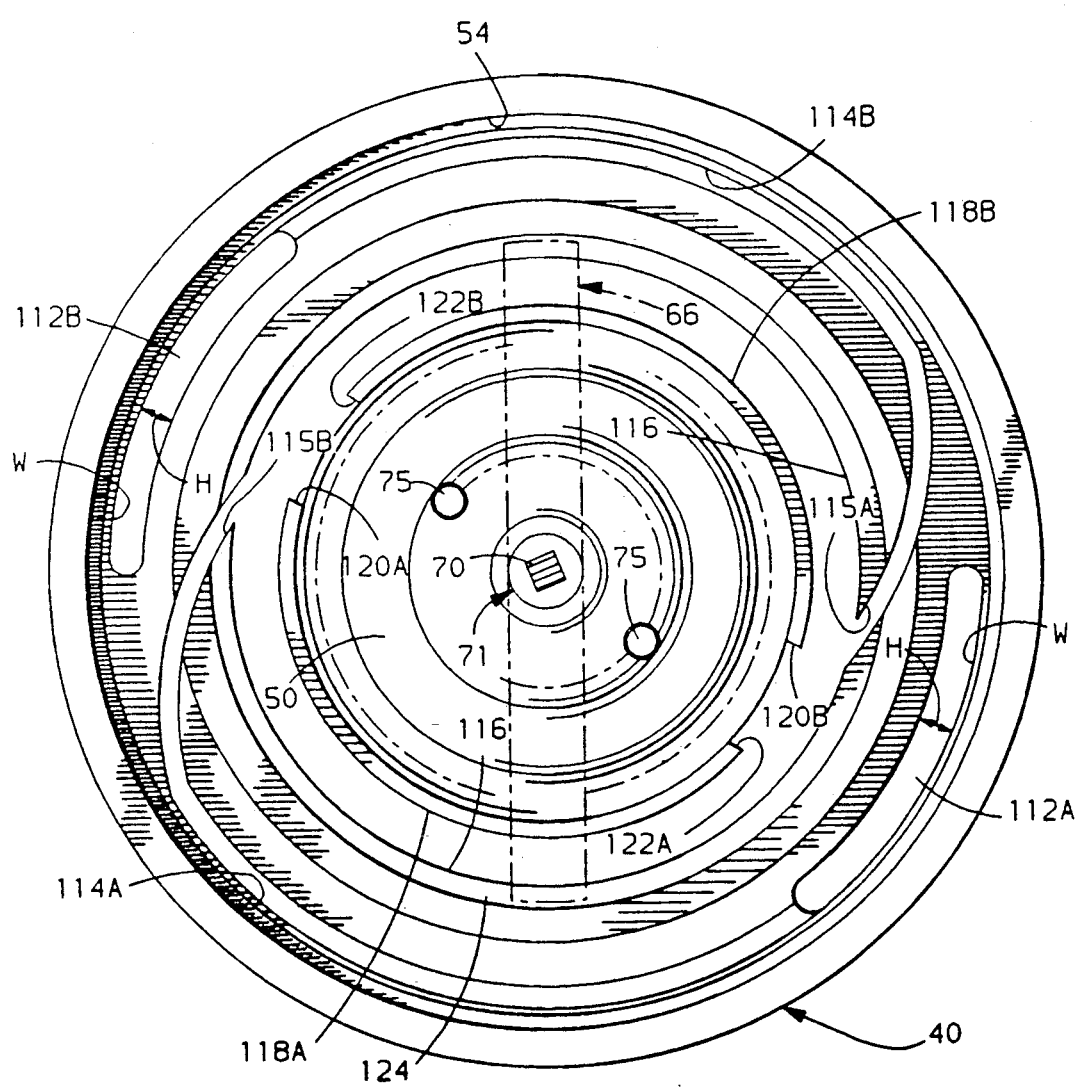
FIG. 4 is a slightly reduced elevational view of an inner surface of the present cover, removed from the clutch position of FIG. 1 for purposes of clarity, illustrating a fluid return path comprising fluid accumulators, non-radial channels and an annular reservoir and a pair of arcuate baffle walls provided at the outer radial boundary of the reservoir.

The interior surface of the cover 40 includes channel means for directing return fluid to the reservoir 50 and for preventing the migration of fluid from the reservoir 50 through the orifices 108A, 108B into the shear zone 88 when the clutch 10 is at rest. As illustrated best in FIG. 4, the interior surface of the cover 40 includes a pair of diametrically opposed fluid accumulators 112A, 112B. Each fluid accumulator 112A, 112B, formed as an arcuate groove, is positioned radially outbound of the reservoir 50 and aligned with a respective orifice 108A, 108B when the cover 40 is secured to the housing 26. Preferably, the radial height indicated at H (FIG. 4) for each accumulator 112A, 112B is such that the outer wall W is positioned at a greater radial distance than the respective orifice 108A, 108B.

An arcuate or non-radial channel 114A, 114B begins at each accumulator 112A, 112B and terminates at an annular spillway 116 which encircles and is in fluid communication with the reservoir 50. Preferably, each channel 114A, 114B is radially aligned with the outer wall W of a respective accumulator 112A, 112B and is formed at a constant radius for at least the first 90 degrees. After the first 90 degrees, each channel 114A, 114B curves inwardly so that a respective discharge point 115A, 115B intersects the spillway 116. As illustrated best in FIG. 2, the depth of each accumulator 112A, 112B is preferably more than the depth of a respective channel 114A, 114B. The depth of the spillway 116 is preferably equal to the depth of the channels 114A, 114B, and the depth of the reservoir 50 is greater than the depth of the spillway 116.

The cross-sectional area of each channel 114A, 114B must be sufficient to accommodate fluid flow for conventional viscous fluids used in friction drive clutches. The cross-sectional area of the accumulator 112A, 112B is preferably at least equal to the cross-sectional area of each channel 114A, 114B. Also, the cross-sectional area of the accumulators 112A, 112B is preferably at least equal to the area of each orifice 108A, 108B.

In operation, fluid exiting the pumping chamber 106 is pumped through the orifices 108A, 108B and received in a respective accumulator 112A, 112B. Centrifugal forces of the rotating clutch 10 force the fluid to the outer wall W. As the fluid level increases in the accumulators 112A, 112B, the fluid pressure becomes greater than the fluid pressure in the reservoir 50, creating centripetal forces which pump fluid through the channels 114A, 114B to the spillway 116 and the reservoir 50.

Two benefits are gained as fluid travels through the accumulators 112A, 112B and channels 114A, 114B. First, return fluid flowing from the pumping chamber 106 to the reservoir 50 is controlled along a closed path to ensure that all fluid in the clutch 10 circulates, thereby improving fluid heat distribution. Many prior art designs included pockets or cavities which may have blocked some fluid from circulation. Heat transfer away from the fluid through the present cover 40 is improved due to the controlled return path to the reservoir 50 provided by the accumulators 112A, 112B, the channels 114A, 114B and the spillway 116.

The second benefit gained by the present fluid return path is the elimination of migrating fluid from the reservoir 50 to the shear zone 88 when the clutch 10 stops rotating (static mode). Centripetal forces pump the majority of fluid from the channels 114A, 114B to the reservoir 50. Fluid stored in the reservoir 50 cannot return to the accumulators 112A, 112B due to the geometry of the channels 114A, 114B. Any fluid remaining along the length of the channels 114A, 114B can migrate back to the accumulators 112A, 112B. Preferably, the fluid volume capacity in a channel 114A, 114B is less than the fluid volume capacity of a respective accumulator 112A, 112B. Due to the location of an orifice 108A, 108B with respect to the outer wall W of the accumulator 112A, 112B, no substantial quantity of fluid overflows through an orifice 108 back into the pumping chamber 106.

When a vehicle is traveling at highway speeds and then suddenly comes to a stop (e.g., after exiting a freeway), it is desirable to have the clutch 10 engage and rotate the fan 34 to provide a cooling airflow through the engine compartment. This engagement is desirable even though the bimetallic coil 76 does not react to rotate the control arm 66 to permit fluid flow from the reservoir 50 to the working chamber 56. In such circumstances, the present cover 40 can accommodate this cooling requirement as fluid travels from the reservoir 50 through the channels 114A, 114B, accumulators 112A, 112B and orifices 108A, 108B to reach the shear zone 88 when the clutch 10 is rotating, i.e., dynamic mode. Since no mechanical value elements are utilized, fluid can flow from the reservoir 50 to the shear zone 88 due to the fluid pressures inside the clutch 10.

The present cover 40 includes fluid return channel means leading to a reservoir 50 which prevent migration of fluid back into a shear zone 88 of the clutch 10 in the static mode fluid. The fluid return channel means relies upon the geometry and construction of fluid accumulators 112A, 112B and channels 114A, 114B to prevent unwanted return flow without the use of mechanical valves. Accordingly, unwanted high-speed fan rotation is eliminated from a clutch 10 which has been at rest and wherein the viscous fluid has achieved equilibrium.

A pair of arcuate baffle walls 118A, 118B are provided on the interior surface of the cover 40, preferably at the radial outer boundary of the reservoir 50 and perpendicular to the pump plate 52. The baffle walls 118A, 118B assist in the prevention of fluid migration from the reservoir 50 to the shear zone 88 when the clutch 10 is in the static condition.

Each baffle wall 118A, 118B is formed as an arcuate portion spanning approximately 150 degrees along the outer radial boundary of the reservoir 50. As illustrated best in FIGS. 4 and 5, the location of the baffle walls 118A, 118B coincides with the inner radial boundary of the spillway 116. As viewed in FIG. 4, baffle wall 118A begins at an origination point 120A adjacent the discharge point 115B and spans an arcuate path counter-clockwise for approximately 150 degrees to a termination point 122A. A gap of approximately 30 degrees is provided between termination point 122A and an origination point 120B of baffle wall 118B. Baffle wall 118B spans an arcuate counter-clockwise path for approximately 150 degrees to a termination point 122B. A gap of approximately 30 degrees is provided between termination point 122B an origination point 120A. The gaps are preferably positioned to provide an unobstructed path for fluid exiting the discharge points 115A, 115B, passing through the spillway 116 and entering the reservoir 50. The length of each baffle wall 118A, 118B can be changed depending on factors such as system fluid volume, radial location and alignment with the discharge ports 64A, 64B. Preferably, the baffle walls 118A, 118B are oriented so that a complementary discharge port 64A, 64B in the pump plate 52 is positioned near the mid-point of the arcuate path.

When the clutch 10 is assembled, the baffle walls 118A, 118B act as a support for the control arm 66. The control arm 66 rests on the baffle walls 118A, 118B and spans to an annular, recessed groove 124 provided in the inner surface of the cover 40 circumferentially about the spillway 116. The depth of the groove 124 in the inner surface and the distance between the baffle walls 118A, 118B and the pump plate 52 are sufficient to accommodate rotation of the control arm 66 by the bimetallic coil 76 as described above. As illustrated best in FIG. 5, the radial positions of the discharge ports 64A, 64B and the spillway 116 are aligned to permit fluid to flow from the reservoir 50 to the spillway 116 and through the uncovered discharge ports 64A, 64B. The outer sidewall of the spillway 116 acts as a dam and forces fluid to travel to the working chamber 56 at higher pressures than are found in conventional clutches.

The baffle walls 118A, 118B, the groove 124 and the pump plate 52 form a support system which traps the wings 68A, 68B of the control arm 66 and limits the axial deflection of the wings 68A, 68B away from respective discharge ports 64A, 64B, thereby enhancing the seal provided by the wings 68A, 68B when the control arm 66 is in the closed position. For example, in a clutch where conventional end play in a control shaft is 0.030 inch, the present support system limits the deflection of the wings 68A, 68B away from the discharge ports 64A, 64B to a range of 0.002-0.007 inch. Furthermore, the baffle walls 118A, 118B act as pivot points which urge the wings 68A, 68B toward the discharge ports 68A, 68B to enhance the seal effect.

When the clutch 10 is in the static condition, the baffle walls 118A, 118B limit the amount of fluid in the reservoir 50 which can reach the discharge ports 64A, 64B. When a discharge port 64A, 64B comes to rest at a position below the semi-cylindrical static fluid level, a respective baffle wall 118A, 118B acts as a barrier or metering restriction to fluid in the reservoir 50 seeking an equilibrium position in the spillway 116. If the static fluid volume in the reservoir 50 is such that not enough fluid can accumulate in the reservoir 50 and reach the spillway 116 past an end of a baffle wall 118A, 118B, then only the fluid which was present in the spillway 116 when the clutch 10 stopped can collect at a wing 68A, 68B adjacent the submerged discharge port 64A, 64B. If the control arm 66 is rotated by the bimetallic coil 76 (e.g., an "after-boil" condition wherein ambient temperatures in an engine compartment reach a level to excite the bimetallic coil 76), only this limited amount of fluid can pass through the discharge port 64A, 64B. Limiting fluid which can reach the spillway 116 can reduce or eliminate "morning sickness" previously caused by an after-boil condition in a static clutch 10. The present baffle walls 118A, 118B limit the amount of fluid which can reach a discharge port 64A, 64B in an after-boil condition.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A viscous fluid clutch comprising:
   (a) an input shaft;
   (b) a clutch plate driven by the input shaft;
   (c) housing means having a hollow interior containing the input shaft and the clutch plate;
   (d) a pump plate internally mounted in the housing means to separate a reservoir formed in the housing means from a working chamber;
   (e) a predetermined volume of viscous fluid stored in the reservoir which enters the working chamber through controlled discharge ports provided in the pump plate and returns to the reservoir through return orifices provided in the pump plate radially outbound of the discharge orifices;
   (f) control arm means for covering and uncovering the discharge ports;
   (g) baffle wall means formed in the housing means at the outer radial boundary of the reservoir perpendicular to the pump plate so that a clearance between the baffle wall means and the pump plate receives an intermediate portion of the control arm means; and
   (h) a groove formed in the housing means radially outbound of the baffle wall means for receiving terminating portions of the control arm means; whereby the baffle wall means and the groove cooperate with the pump plate to limit the axial deflection of the control arm means from the discharge ports.

2. The clutch specified in claim 1 wherein the control arm is a flexible, longitudinal member.

3. The clutch specified in claim 1 wherein the baffle wall means comprises a pair of arcuate baffle walls, each wall spanning approximately 150 degrees, wherein a distance of approximately 30 degrees is provided between each wall and aligned to provide a substantially unobstructed path from the discharge ports to the reservoir.

4. The clutch specified in claim 1 wherein an annular spillway in fluid communication with the reservoir is formed radially outbound of the baffle wall and radially inbound of the groove.

5. The clutch specified in claim 4 wherein the spillway is radially aligned with discharge ports in the pump plate.

6. A cover for a viscous fluid clutch, the cover cooperating with a housing to form a working chamber and a reservoir separated by an internally mounted pump plate, the pump plate including discharge ports for selectively permitting fluid flow from the reservoir to the working chamber and return orifices permitting the return of fluid from the working chamber to the reservoir, wherein a control arm is selectively rotated to cover and uncover the discharge ports, the cover comprising:
  (a) a dished member having inner and outer surfaces;
  (b) annular reservoir means formed in the inner surface for storing fluid;
  (c) non-radial fluid passageway means formed in the inner surface for directing fluid to the reservoir means; and
  (d) arcuate baffle wall means formed in the inner surface at the outer radial boundary of the reservoir means substantially perpendicular to the pump plate, wherein a clearance between the baffle wall means and the pump plate receives and limits the axial deflection of the control arm from the discharge ports.

7. The cover specified in claim 6 wherein the baffle wall means comprises a pair of arcuate baffle walls, each wall spanning approximately 150 degrees, wherein a distance of approximately 30 degrees is provided between each wall and aligned to provide a substantially unobstructed path from the discharge ports to the reservoir.

8. The cover specified in claim 6 including a spillway formed in the inner surface of the cover radially outbound of the reservoir in fluid communication with the reservoir means.

9. The cover specified in claim 8 wherein the spillway is radially aligned with the discharge ports.

10. The cover specified in claim 8 wherein the fluid passageway means terminates at the radial outer boundary of the spillway.

11. A method for reducing fluid flow through thermostatically-controlled discharge ports in a pump plate of a static viscous fluid clutch having a reservoir formed in a cover and separated from a working chamber by the pump plate, the method comprising the steps of:
  (a) providing valve means adjacent the discharge ports;
  (b) providing control means for actuating the valve means to open and close the discharge ports; and
  (c) forming a pair of spaced-apart arcuate walls in an inner surface of the cover at an outer radial boundary of the reservoir for restricting the flow of fluid from the reservoir to an area adjacent the discharge ports.

12. The method specified in claim 11 wherein the walls are substantially perpendicular to the pump plate.

13. The method specified in claim 11 wherein each wall spans approximately 150 degrees with an approximately 30 degree gap provided between each wall and aligned to provide a substantially unobstructed path from the discharge ports to the reservoir.

* * * * *